Jan. 1, 1957    C. J. ZEITLER, JR    2,775,786
CARCASS SPLITTING MACHINES
Filed May 27, 1954
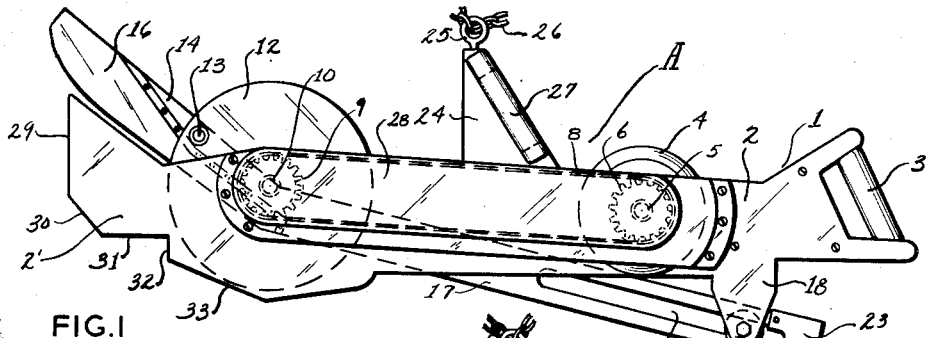
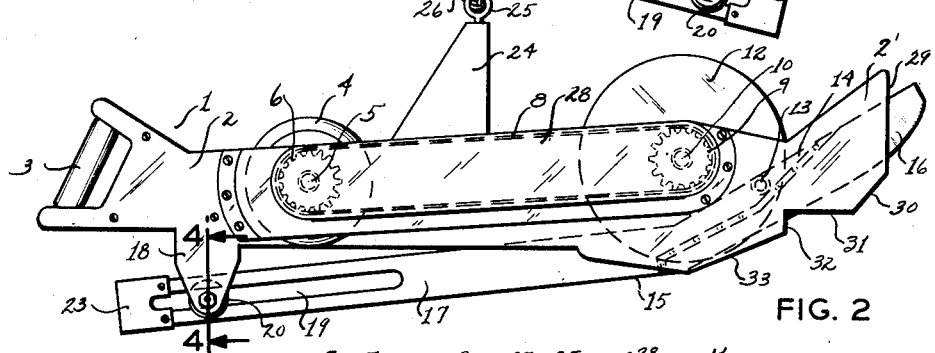
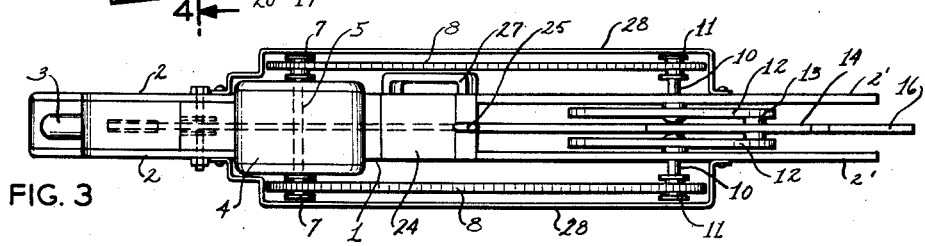
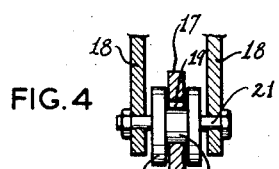
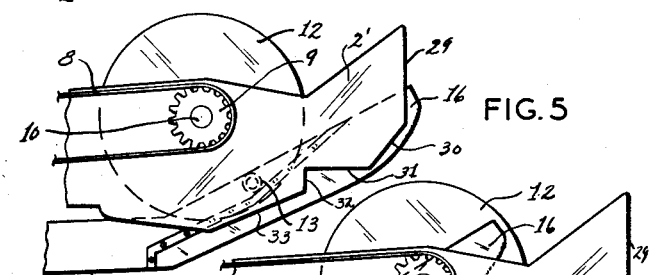
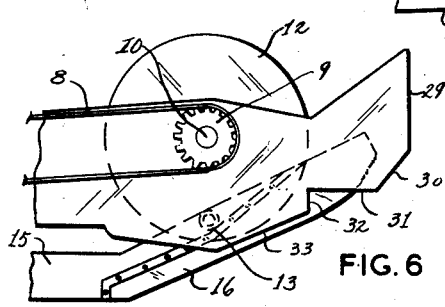
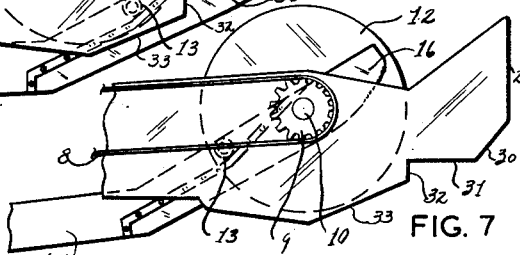
INVENTOR.
CARL J. ZEITLER, JR.
BY Ralph W. Kalish
ATTORNEY United States Patent Office 2,775,786
Patented Jan. 1, 1957

2,775,786

CARCASS SPLITTING MACHINES

Carl J. Zeitler, Jr., St. Louis, Mo.

Application May 27, 1954, Serial No. 432,738

15 Claims. (Cl. 17—23)

This invention relates in general to slaughtering tools and, more particularly, to a hand-operated machine for splitting carcasses of hogs, sheep, cattle, and the like.

The cleaving of carcasses in slaughterhouses is a most important step in the preparation of meats since inaccurate splitting of the spinal column considerably affects the salability of the meat through disfigurement and by the impaired appearance thereof. Also there is the danger of splintering and chipping of the vertebrae whereby subsequent handlers of the carcass may be painfully injured.

Although heretofore there have been several attempts to develop carcass splitting or cleaving machines, the same have not proved reliable and, hence, in general practice, hand cleaving tools are used. Experience and skill are required for effective manipulation of a hand tool of this character as the nature and construction of the spinal column to be split must be properly taken into account. It is recognized that the type of stroke needed for severing the coccygeal and sacral vertebrae is different than that for splitting the lumbar and thoracic vertebrae which comprises the loin and rib chops. Similarly, the cutting instrument must be presented in a different manner for the effective cleaving of the shoulder-adjacent vertebrae. The various carcass splitting machines that have been tried did not operate reliably as the same were adapted to cut the various vertebrae sections in the same manner, with consequent imperfect severing action.

In using hand tools, workmen must be rested periodically since such require great and fatiguing effort. Furthermore, unless the operator is highly experienced, improper cutting will occur with attendant financial loss.

Therefore, it is a primary object of the present invention to provide a carcass-splitting machine which can be readily operated by a single, relatively unskilled individual without development of undue fatigue, and which is adapted for assuring accurate splitting.

Another object of the present invention is to provide a hand-operated carcass splitting machine which incorporates a series of guide portions for reliably assuring presentation of the cutting blade in the requisite attitude to the various portions of the spinal column of a carcass for effecting clean-cut, non-disfiguring severance.

A further object of the present invention is to provide a carcass splitting machine which incorporates a uniquely operated cutting blade for co-action with the guide portions whereby the desired cutting stroke is provided for the particular vertebrae.

Another object is to provide a carcass splitting machine which may be economically produced; which is durable; and the operation of which will be at a relatively reduced cost.

These and other detailed objects are obtained by the structure illustrated in the accompanying drawing in which:

Figure 1 is a side elevation of a carcass-splitting machine constructed in accordance with and embodying the present invention, showing the cutter blade preparatory to movement through the guide elements.

Figure 2 is an elevation view of the opposite side of the machine, showing the cutter blade between the upper guides.

Figure 3 is a top plan view.

Figure 4 is an enlarged vertical transverse section taken on the line 4—4 of Figure 2.

Figures 5, 6, and 7 are fragmentary side views showing the blade in sequential positions during operation successive to positions shown in Figures 1 and 2.

In the accompanying drawing, A designates a portable carcass-splitting machine comprising a casing 1 having a pair of side plates 2 which project at one end beyond casing 1 to form spaced extensions 2'. Adjacent the opposite end of casing 1 there is provided an end handle 3. Casing 1 mounts a motor 4 between handle 3 and extensions 2', having its drive shaft 5 presented transversely of casing 1, and with the ends thereof projecting beyond side plates 2. Motor 4 may be actuated by any convenient means such as a switch located in handle 3. Carried on each end of drive shaft 5 is a sprocket wheel 6, maintained against displacement by collar members 7, and having engaged thereabout one end of a drive chain 8. The opposite end of each drive chain 8 is trained about a sprocket wheel 9 mounted upon the outer end of a pin shaft 10 journaled in each side plate extension 2', adjacent the end extremities thereof. Sprocket wheels 9 are held against lateral shifting by collars 11. Pin shafts 10 extend a short distance beyond the inner face of the associated side plate extension 2' but terminate spacedly from each other and have engaged upon such extended portions a disk crank 12. Disk cranks 12 are thus presented in planar parallel relation to each other and to side plate extensions 2'. Pin shafts 10 are axially aligned so that disk cranks 12 are rotatable about a common axis. An eccentric crank pin 13 is engaged at its ends to the cranks 12 for extension therebetween and thus, in effect, completing a double crank arrangement.

Secured to crank pin 13 is the forward portion 14 of a pitman-forming cutter bar 15; said forward portion 14 having its axis inclined with respect to the longitudinal axis of side plates 2 with its rearward end lower, and being provided on its under surface with a groove (not shown) for receiving the upper edge of a cutter blade 16 removably engaged therein, as by screws. Continuous with forward portion 14 of cutter bar 15 is an elongated section 17 with its axis forming an angle of less than 180° with forward portion 14, whereby said elongated section will, during the course of reciprocal operation of cutter bar 15 move through one position of substantial axial parallelism with side plates 2 (Figure 6). Cutter bar 15 extends rearwardly beneath casing 1 and between a pair of ears 18 projecting from the normally lower edge of each side plate 2 approximately intermediate motor 4 and handle 3. Provided in the rearward end of elongated section 17 is an axial guideway or slot 19 for relative movement therein of a roller 20 mounted for rotation upon a pin 21 extending between, and secured at its ends in, ears 18. Side flanges 22, of increased diameter, are formed on roller 20 so that inadvertant displacement of roller 20 from guide-way 19 is prevented. Detachably secured on the rearward end extremity of cutter bar 15 is a cap member 23 for effectively closing guide-way 19 and permitting facile removal of cutter bar 15. Substantially centrally of machine A there is upstanding from the upper face of casing 1 a balancing, block-like member 24 having at its upper end an eyelet 25 for engagement to a support chain 26 whereby machine A may be conveniently suspended from a conventional overhead conveyor, or the like (not shown). On one side of member 24 there is formed a handle 27 for enhancing controlled manipulation of machine A by an operator. Secured to the outer face of each side plate 2 is a guard 28 for encasing drive chains 8 and sprocket wheels 7, 11.

Side plate extensions 2' extend beyond cranks 12 and are marginally contoured to form a series of guides or carcass-addressing edges, including an upper or first guide 29 presented in normal relation to the axis of side plates 2 and extending at one end therebeyond. The other or normally lower end of guides 29 is continuous by a rearwardly inclined connecting portion 30 with a middle or second guide comprising perpendicularly related edges 31, 32, the former being normal to upper guide 29 and the latter being relatively short and parallel to upper guide 29. The lower end of edge 32 of middle guide is adjacent the normally forward or upper end of a lower or third guide 33 which is relatively long and forms an angle of more than 90° and less than 135° with said edge 32. As shown more fully hereinbelow, the upper, middle, and lower guides cooperate successively with cutter blade 16 for providing the requisite cutting stroke for effective splitting of the particular portion of the spinal column of the carcass being severed. The angulated character of cutter bar 15 will cause cutter blade 16 to follow a primarily downward path between uper guides 29 and thence rearwardly between the middle and lower guides with but a limited component of downward travel therethrough. With reference being made to Figures 5 and 6 it will be seen that when the cutting edge of cutter blade 16 projects beyond middle guard elements 31, 32, and lower guard 33 the same will be following substantially oblique paths of decreasing inclination with respect to the longitudinal axis of side plates 2.

In operation, machine A is preferably suspended, as above stated, from a suitable support, such as a conveyor, and counterweights may be associated therewith in any well known manner so that machine A is easily manipulated, with the operator being relieved of supporting same. The carcass to be split will be presented on a gambrel bar in the customary manner, being suspended by the legs with the gambrel bar serving to urge separation of the legs and the halves of the carcass as the cleaving of the vertebrae proceeds. The gambrel bar may, of course, be supported from a hanger and adapted for movement along a conveyor in the usual packing-house manner. The carcass will be in a fully eviscerated condition, with an opening extending substantially the length of the body.

The operator will first make certain that blade 16 is above side plate extensions 2', as shown in Figure 1, and will then address machine A to the carcass to be split so that upper guide edges 29 are presented against the abdominal portion of the carcass with the upper ends adjacent the crotch, said edges 29 being on opposite sides of the cut or opening. With guide 29 so disposed, connecting portions 30 will be disposed upon the sacrum curve, which further firms machine A in position. Motor 4 is energized causing blade 16 to be driven between guides 29 so that the projecting portions thereof will sever the coccygeal portion of the vertebrae with a stroke which is substantially downward. The tail-adjacent vertebrae are relatively small and hence are readily severed by such cutting action. It will be noted that by holding machine A against the carcass a reasonably firm support is provided to assure that blade 16 will accurately follow the prescribed path. As the cutting proceeds downwardly, the operator will lower machine A by means of its counterweighted suspension so that upper guides 29 are maintained against the carcass until completion of the splitting of the lower vertebrae. The extent of such downward movement will, of course, depend upon the size of the animal.

Although machine A will operate effectively in any attitude, it has been found preferable that it be maintained in horizontal position, that is, wherein the longitudinal axis is parallel to the floor, throughout the splitting operation.

In splitting the next section of vertebrae containing the lumbar and thoracic portions, the operator will push the guide-bearing end of machine A through the space between the already severed portions of the carcass to cause edges 31 of the middle guide to rest upon the upwardly presented opposite sides of the cut, in continued alignment with the spinal column, and with edges 32 abutting against the carcass front. Thus, the cutting stroke will be determined by the middle guide and hence a single direction, limited sweeping-like, sawing-type stroke will be effected upon these vertebrae, which are relatively thick. The attitude of cutting blade 16 for this aspect of the splitting is best shown in Figure 5. As the severing continues, edges 31 will be maintained upon the uper sides of the developing cut with consequent downward movement of the adjacent end of machine A.

After completion of splitting the "chops-bearing" portion of the spinal column, the operator will then push machine A further through the already split portion of the carcass to present edges 33 of the lower guide upon the upwardly facing, opposed sides of the cut so that the shoulder-adjacent vertebrae will be severed by the portion of blade 16 projecting beyond said guide (see Figure 6). Thus, blade 16 will be disposed in a relatively shallow oblique manner for effecting a long sweeping-type stroke requisite for splitting of the aforesaid vertebrae.

With machine A being presented horizontally, blade 16 will be automatically disposed by the guides for effective cutting of the various vertebrae. The coccygeal vertebrae, being small, can be severed by a substantially vertical stroke wherein the blade is relatively steeply slanted. With the lumbar and thoracic vertebrae the blade must have a less steeply slanted attitude to avoid a rebounding of the blade with attendant undesired chipping or splintering of the bone. Similarly, blade 16 is further altered in degree of slant with respect to the cut for efficient and accurate severance of the upper vertebrae. The coaction between blade 16 and said upper, middle, and lower guides provides proper severance, without requiring such skill of an operator, as would be needed for manipulating a hand cleaver.

It should be recognized that any type of suitable drive means may be incorporated in machine A for effecting rotation of cranks 12. Motor 4 with drive chains 8 is merely exemplary of such means. Machine A may be readily and reliably used for any type carcass, such as of cattle, hogs, etc., since it is necessary with all such carcasses that the various cutting strokes be used for different sections of the spinal column.

The details of construction can be varied without departing from the spirit of the invention and the exclusive use of those modifications coming within the scope of the claims contemplated.

What I claim and desire to secure by Letters Patent is:

1. A carcass splitting machine comprising a casing having side plates extending at one end beyond the casing, a crank disposed between and mounted on the extended portions of said side plates, drive means carried on said casing and operatively connected with said crank for rotation of same, and a cutter blade eccentrically carried on said crank for movement therewith and being disposed for projection of its cutting edge beyond the outer end of said side plate extended portions during a portion of its cycle of travel.

2. A carcass splitting machine comprising a casing having side plates extending at one end beyond the casing, a disk crank mounted for rotation on each side plate extension, drive means carried on said casing and operatively connected with each crank for rotation thereof, said cranks being connected by an eccentric pin for mutual rotation, a cutter blade disposed between said cranks and mounted on said crank pin for movement therewith upon rotation of said cranks, said cutter blade being disposed for projection of its cutting edge beyond the outer end of said side plate extended portions during a portion of its cycle of travel.

3. A carcass splitting machine as described in claim 2 wherein each crank is mounted on a pin shaft journaled in the side plate extensions, said pin shafts being axially aligned for rotation of said cranks about a common axis.

4. A carcass splitting machine comprising a casing having side plates, said side plates projecting beyond said casing to form parallel extensions, a cutter blade carried by said machine and adapted to extend beyond the end margins of said extensions, said extensions being contoured on their end margins to form a series of carcass-addressing or guide edges for cooperation with the cutter blade so that the latter will be presented for accomplishing the stroke indicated for the particular section of vertebrae being split.

5. A carcass splitting machine comprising a casing having side plates, said side plates projecting beyond said casing to form parallel extensions, said extensions being contoured on their end margins to form a series of carcass-addressing or guide edges with the upper of said edges being axially normal to the longitudinal axis of the side plates, and the successive carcass-addressing edges are located rearwardly, or toward the casing, of said upper edges, and a cutter blade carried by said machine and adopted for intermittent passage beyond the guide edges sequentially from the uppermost to the lowermost thereof.

6. A carcass splitting machine comprising a casing having side plates, said side plates projecting beyond said casing to form parallel extensions, and a cutter blade carried by said machine, said extensions being contoured on their end margins to form a series of carcass-addressing or guide edges comprising upper, middle, and lower guides for respective use with the coccygeal, lumbar and thoracic and shoulder-adjacent vertebrae of the spinal column to be split said cutter blade being adopted for sequential projection beyond said upper, middle, and lower guides.

7. A carcass splitting machine comprising a casing having side plates, said side plates projecting beyond said casing to form parallel extensions, and a cutter blade carried by said machine and adapted to extend beyond the end margins of said extensions, and drive means for effecting movement of said blade, said extensions being contoured on their end margins to form a series of carcass-addressing or guide edges comprising a first guide which is normal to the longitudinal axis of the side plates, and a second guide having perpendicular edge portions, one of which is parallel to said first guide and the other being normal thereto.

8. A carcass splitting machine as described in claim 7 wherein a downwardly and rearwardly inclined edge portion is between the said first guide and the second guide.

9. A carcass splitting machine as described in claim 7 wherein there is provided a third guide disposed rearwardly and below said second guide and constituting an edge portion inclined with respect to the longitudinal axis of the side plates.

10. A carcass splitting machine comprising a casing having side plates, said side plates projecting beyond said casing to form parallel extensions, a cutter blade carried by said machine and adapted to extend beyond the end margins of said extensions, said extensions being contoured on their end margins to form a series of carcass-addressing or guide edges comprising a first or upper guide which is normal to the longitudinal axis of the side plates for cooperation wtih the blade in splitting the coccygeal vertebrae, a second guide having perpendicular edge portions, one of which is parallel to said first guide and the other being normal thereto, for cooperation with the blade in cleaving the lumbar and thoracic vertebrae, a downwardly and rearwardly inclined edge portion between said first and second guide for disposition on the sacrum curve during splitting of the coccygeal vertebrae, and a third guide disposed rearwardly and below said second guide and constituting a relatively long edge portion inclined with respect to the longitudinal axis of the side plates for use with the blade in splitting the shoulder-adjacent vertebrae.

11. A carcass splitting machine comprising a casing having side plates extending at one end beyond the casing, a crank disposed between and mounted on the extended portions of said side plates, drive means carried on said casing and operatively connected wtih said crank for rotation of same, a cutter bar operatively connected adjacent one end to said crank, said cutter bar extending beneath said casing, means for slideably supporting the cutter bar proximate its other end from said casing, a cutter blade removably carried on said cutter bar adjacent said crank for projection of its cutting edge beyond the outer end of said side plate extended portions.

12. A carcass splitting machine as described in claim 11 wherein the outer ends of the side plate extended portions are contoured to provide a series of carcass-addressing edges or guides for cooperation with said blade during vertebrae-splitting operation.

13. A carcass splitting machine comprising a casing having side plates extending at one end beyond the casing, a crank disposed between and mounted on the extended portions of said side plates, drive means carried on said casing and operatively connected with said crank for rotation of same, a cutter bar eccentrically and operatively connected in its forward portion of said crank for movement therewith, said cutter bar having a rearward portion extending beneath said casing, means engaging said rearward portion of the cutter bar to the casing for relative movement, said forward and rearward portions forming an angle of less than 180° with said forward portion being inclined with respect to the longitudinal axis of the side plates, a cutter blade removably carried in the forward portion of said cutter bar, and being disposed for projection of its cutting edge beyond the outer end of said side plate extended portions during a portion of its cycle of travel.

14. A carcass splitting machine as described in claim 13 wherein the outer end margin of said side plate extended portions are contoured to provide a descending series of carcass-addressing or guide edges for presenting the cutting blade to the various sections of the carcass spinal column in requisite attitude for effective splitting thereof.

15. A carcass splitting machine comprising a casing, end extensions in spaced parallel relation provided on said casing, crank means mounted on said casing, a cutter blade eccentrically connected to said crank means for cyclic movement thereby, said blade being so dimensioned that its cutting edge will project beyond said extensions for a portion of its cycle of travel, said end extensions being contoured to form a plurality of guide edges for successive cooperation with said blade during vertebrae splitting operation.

References Cited in the file of this patent

UNITED STATES PATENTS

| | | |
|---|---|---|
| 902,709 | Burleson | Nov. 3, 1908 |
| 1,028,468 | Karhan | June 4, 1912 |
| 1,271,909 | Karhan | July 9, 1918 |

FOREIGN PATENTS

| | | |
|---|---|---|
| 39,714 | Denmark | Jan. 21, 1929 |